ial No. 421,420

2,830,893
PROCESSES FOR MAKING TITANIUM

Reginald S. Dean, Hyattsville, Md., assignor to Chicago Development Corporation, Riverdale, Md.

No Drawing. Application April 6, 1954
Serial No. 421,420

2 Claims. (Cl. 75—84)

This invention relates to the production of titanium and zirconium, and is concerned especially with methods for preparing these metals from their compounds by reduction of the latter with an excess of alkali or alkaline earth metals. It has as a principal object the preparation of massive titanium or zirconium, in suitable form for arc furnace melting or electrorefining.

It is well known in the art to reduce titanium and zirconium chlorides with magnesium. In commercial practice the reactants are in such proportion that there is obtained a spongy mass including unreacted magnesium and magnesium chloride. It has been proposed to remove the magnesium from the reaction zone while it is still in great excess and to separate the reaction products from it, thus permitting the process to be made continuous. Attempts to separate the titanium, or zirconium, and magnesium chloride from the great excess of magnesium metal have not, however, been successful because the dispersion of the titanium or zirconium particles in the magnesium is very stable.

I have found that this dispersion may be readily broken, and a coherent mass of titanium or zirconium formed, by impingement on a heated surface.

The dispersion for the practice of my invention may be formed as the reaction of titanium or zirconium chlorides or oxides with a great excess of a suitable alkali or alkaline earth metal. By a suitable metal I mean one which will bring about reduction of the compound rapidly, at a practicable temperature.

The formation of such dispersions is old, and I do not claim it broadly as part of my invention, which latter relates to the separation of such dispersions however formed by impingement and to procedures for forming such dispersions in a manner particularly suitable for impingement separation.

Impingement may be accomplished in various ways and for the purpose of this description I wish to define by the term impingement any procedure which brings the hot titanium or zirconium particles into contact with a solid surface with a force at least ten times greater than gravity.

I may, for example, set up a centrifugal system whereby the reaction product of magnesium and titanium chloride is impinged on a solid surface. I do this at a temperature above the melting point of magnesium chloride and find that only the titanium is built up as a coherent mass on the impingement surface.

I may also use the reaction product of titanium oxide with a great excess of magnesium. In this case the magnesium oxide being lighter than the magnesium is not thrown to the impingement surface but may be separated from the magnesium leaving the surface.

Preferably I use a jet of the molten alkali or alkaline earth metal which is directed toward an impingement surface. Into this jet at proper temperature I inject the titanium or zirconium compound to be reduced. The titanium or zirconium builds up on the impingement surface while the excess of the alkali or alkaline earth metal and the other suspended reaction products run off the impingement surface. The material which runs off the surface is separated by known means and the alkali or alkaline earth metal returned to the system. By suitably advancing the impingement surface a continuous elongated mass of titanium or zirconium can be built up. Such a piece of metal may be used as an electrode in an arc melting furnace, or an electrolytic refining cell.

It will be clear that the jet of alkali or alkaline earth metal must be at a temperature at which the reaction proceeds rapidly but at which evaporation is not excessive. An atmosphere of inert gas throughout is also required.

I prefer to accomplish this by establishing a potential between the impinged plate and the jet orifice whereby an electric current is caused to flow in the jet stream. By regulating the current I can produce any desired temperature in the jet stream without excessive heat loss.

I am familiar with proposed methods of making titanium in which centrifugal force is applied to the reduction system. For example, it has been proposed to support molten magnesium on a vortex of magnesium chloride, and thus carry on the reaction so that the titanium produced will not come in contact with the walls of the supporting vessel. Such a procedure is quite the opposite in its action to my procedure. The essence of my invention is the building up of a mass of titanium from a dilute dispersion by impingement. This action depends upon the weldability of solid titanium to itself at high temperatures. It is necessary, however, to bring the titanium particles together by a force at least ten times gravity.

I am also familiar with procedures in which jets of magnesium and titanium tetrachloride are brought together at reaction temperatures. Such procedures are in no way comparable to my invention, which employs at least ten times as much magnesium as is required for the reduction, and separates the resulting product, which is a dispersion of titanium particles in magnesium, by impingement of this dispersion on a surface.

Having now decribed my invention in its general aspects, I will now illustrate it by examples.

Example I

I take a steel bowl mounted on a centrifuge spindle and place 1000 grams of magnesium in it. The basket is of such size that when turned at 5000 R. P. M. the molten magnesium will form a definite vortex and leave a small area on the bottom of the bowl free from metal. The basket is maintained in a pure argon atmosphere at 900° C. $TiO_2$ is fed into the side of the vortex at the rate of 1 gram per second for two minutes, or a total of 120 grams. At the end of this time the whole is cooled. The bowl and contents are removed and inverted in an iron vessel and heated to 750° C. The excess magnesium and magnesium oxide are collected in the iron vessel and after cooling in an inert atmosphere the titanium in amount of 80 grams is scraped from the bowl. This titanium is found to contain 10% magnesium and 1% oxygen.

Example II

I take a molten bath of magnesium provided with a pump by means of which the magnesium is forced through a tube leading to an orifice. The temperature of the magnesium is 900° C. The orifice is placed in an inert gas chamber and a stream from the $\frac{1}{16}''$ diameter orifice is directed at a strip of iron having a thin strip of titanium over it. The magnesium is pumped at a rate of 5 G. P. H., and $TiO_2$ is injected into the stream just behind the orifice. The iron strip is raised at a uniform rate so that 1 inch of titanium is built up on it. The $TiO_2$ is injected at the rate of 50 grams per kg. of magnesium pumped. The excess magnesium and the magnesium oxide formed by the reduction collect at the bottom of the chamber from which they are drawn off. After standing for 30 minutes in the molten condition in an inert atmosphere the magnesium oxide is skimmed off and the magnesium returned to the pumping system.

The built up titanium on the impingement strip is removed along with the then titanium covering for the strip and may be used as an anode in an electro-refining bath. The built up titanium mass includes approximately 96% of titanium.

Example III

I take a molten sodium bath at 120° C. and pump this through a system similar to that in Example II. In this instance, however, I inject titanium tetrachloride in the same proportion as the dioxide in Example II. I connect the impingement strip to one pole of an electric transformer and the orifice fixture to the other. The stream of sodium and $TiCl_4$ is thus heated to start the reaction. I place 55 volts across the system and find that reduction is complete and the titanium is deposited on the impingement strip, while excess sodium and dispersed sodium chloride collect in the bottom of the chamber. The sodium chloride sinks and may be drawn off separately from the sodium.

The titanium built up on the impingement strip is removed with the thin titanium cover strip. This material analyzes 99% titanium and 1% sodium, and may be used as an electrode for arc melting.

Example IV

In this example I proceed in a manner identical with Example II except that $ZrO_2$ is used in place of $TiO_2$.

Example V

In this example I proceed in a manner identical with Example II except that $ZrCl_4$ is used in place of $TiCl_4$.

Example VI $TiCl_4$ is added to molten magnesium exactly as in the commercial process. When the titanium content has reached 3% of the magnesium it is withdrawn and forced through an apparatus as in Example II. The excess magnesium is separated from the magnesium chloride by settling and the magnesium returned to the process.

I claim:

1. Process of separating in the form of a coherent mass particles of a metal selected from a first group consisting of titanium and zirconium which particles are dispersed in a large excess of a molten metal selected from a second group consisting of alkali metals, alkaline earth metals and magnesium, which consists essentially in impinging said dispersion, with a force at least 10 times gravity, against a solid surface at a temperature above the melting point of said second group metal and sufficiently high to weld the dispersed particles of the first group metal into a solid mass whereby to build up a mass of said first group metal adherent to said surface and to cause the excess of said second group metal to flow from said surface, said impinging step being conducted in an atmosphere of an inert gas, and thereafter recovering the resulting mass of said first group metal from said surface.

2. Process of producing a coherent mass of particles of titanium which consists essentially in the steps of continuously impinging a stream of molten magnesium, at a temperature of about 900° C., with a force at least 10 times that of gravity, against a metallic impingement strip in a chamber having an atmosphere of inert gas while simultaneously continuously injecting into said stream titanium dioxide at a rate of approximately 50 grams per each kilogram of magnesium, whereby there is impinged against said strip a dispersion of titanium particles and magnesium oxide in a great excess of molten magnesium; raising said impingement strip with respect to said impinging stream at a uniform rate such that an elongated adherent mass of titanium particles is built up on it, collecting molten magnesium and magnesium oxide in the bottom of the chamber, and thereafter removing said elongated adherent mass of titanium particles from said strip.

References Cited in the file of this patent

UNITED STATES PATENTS

| 866,385 | Von Perani | Sept. 17, 1907 |
|---|---|---|
| 1,212,426 | Voigtlander et al. | Jan. 16, 1917 |
| 1,306,568 | Weintraub | June 10, 1919 |
| 2,091,087 | Wempe | Aug. 24, 1937 |
| 2,205,854 | Kroll | June 25, 1940 |
| 2,395,286 | Merle | Feb. 19, 1946 |
| 2,564,337 | Maddex | Aug. 14, 1951 |
| 2,607,674 | Winter | Aug. 19, 1952 |
| 2,708,158 | Smith | May 10, 1955 |

FOREIGN PATENTS

| 253,161 | Great Britain | June 7, 1926 |
|---|---|---|
| 386,621 | Great Britain | Feb. 16, 1933 |
| 1,042,104 | France | June 3, 1953 |
| 827,315 | France | Jan. 24, 1938 |
| 296,867 | Germany | Mar. 13, 1917 |
| 505,801 | Belgium | Sept. 29, 1951 |